United States Patent
Han

(10) Patent No.: US 9,031,890 B2
(45) Date of Patent: May 12, 2015

(54) INVERSE FUNCTION METHOD OF BOOLEAN SATISFIABILITY (SAT)

(71) Applicant: Sherwin Han, Portsmouth, RI (US)

(72) Inventor: Sherwin Han, Portsmouth, RI (US)

( * ) Notice: Subject to any disclaimer, the term of this patent is extended or adjusted under 35 U.S.C. 154(b) by 0 days.

(21) Appl. No.: 14/541,624

(22) Filed: Nov. 14, 2014

(65) Prior Publication Data

US 2015/0074024 A1  Mar. 12, 2015

Related U.S. Application Data

(63) Continuation-in-part of application No. 14/087,380, filed on Nov. 22, 2013, which is a continuation of application No. 13/188,122, filed on Jul. 21, 2011, now abandoned.

(60) Provisional application No. 61/400,880, filed on Aug. 4, 2010.

(51) Int. Cl.
| | |
|---|---|
| *G06F 17/00* | (2006.01) |
| *G06N 5/02* | (2006.01) |
| *G06N 5/04* | (2006.01) |
| *G06N 7/00* | (2006.01) |
| *G06N 99/00* | (2010.01) |
| *G06N 5/00* | (2006.01) |

(52) U.S. Cl.
CPC .. *G06N 5/04* (2013.01); *G06N 7/00* (2013.01); *G06N 99/005* (2013.01); *G06N 5/00* (2013.01); *G06N 5/02* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 6,038,392 A | 3/2000 | Ashar | |
| 6,247,164 B1 | 6/2001 | Ashar | |
| 6,611,841 B1* | 8/2003 | Han | 706/46 |
| 7,120,569 B2 | 10/2006 | Arroyo-Figueroa | |
| 7,194,710 B2 | 3/2007 | Prasad | |
| 7,418,369 B2 | 8/2008 | Moskewicz | |
| 7,543,266 B2* | 6/2009 | Brown, Jr. | 706/10 |
| 7,565,634 B1 | 7/2009 | Boyd | |
| 2005/0182773 A1* | 8/2005 | Feinsmith | 707/100 |
| 2009/0192963 A1* | 7/2009 | Sankaranarayanan et al. | 706/46 |
| 2013/0179378 A1 | 7/2013 | Han | |
| 2014/0289181 A1 | 9/2014 | Han | |

OTHER PUBLICATIONS

Zhang, L.,Madigan, C. F.,Moskewicz,M.W., Andmalik, S. 2001. "Efficient conflict driven learning in a Boolean satisfiability solver". In Proceedings of the International Conference on Computer-Aided Design (ICCAD'01). 279-285.*

(Continued)

*Primary Examiner* — Kakali Chaki
*Assistant Examiner* — Luis Sitiriche
(74) *Attorney, Agent, or Firm* — Robert Plotkin, P.C.

(57) ABSTRACT

A computer system uses an inverse function method to solve Boolean Satisfiability problems. The system benefits from the system disclosed in the US patent "Knowledge Acquisition and Retrieval Apparatus and Method" (U.S. Pat. No. 6,611, 841). The system applies a learning function to access iterative set relations among variables, literals, words and clauses as knowledge; and applies deduction and reduction functions to retrieve relations as reasoning. The system uses knowledge learning (KL) and knowledge reasoning algorithms (KRA). The system abandons the "OR" operation of Boolean logic and processes only set relations on data. The system leverages the reversibility of deduction and reduction to determine whether 3-SAT formulas are satisfiable.

12 Claims, 9 Drawing Sheets

(56) References Cited

OTHER PUBLICATIONS

"A Probabilistic 3-SAT Algorithm Further Improved"; Thomas Hofmeister, Uwe Schoning, Rainer Schuler, Osamu Watanabe Dept. of Mathematical and Computing Sciences, Tokyo Institute of Technology, Meguro-ku Ookayama, Tokyo 152-8552, Japan, H. Alt and A. Ferreira (Eds.): STACS 2002, LNCS 2285, pp. 192-202, 2002. Springer-Verlag Berlin Heidelberg 2002.*

Cook, S., "The P versus NP Problem." Manuscript prepared for the Clay Mathematics Institute for the Millennium Prize Problems, (Apr. 2000) 12 pp. Available from the Clay Mathematics Institute.

Han, X., "Knowledge recognition algorithm enables P=NP." arXiv: 1009.0884 (2010) 3 pp.

Han et al., "3-SAT Polynomial Solution of Knowledge Recognition Algorithm," arXiv:1009.3687, Sep. 20, 2010. 5 pp. Available at: http://arxiv.org/pdf/1009.3687v12.pdf.

Karp, R., "Reducibility Among Combinatorial Problems." in R. E. Miller and J. W. Thatcher (editors). Complexity of Computer Computations. New York: Plenum. pp. 85-103. (1972).

* cited by examiner

| VARIABLE | LITERAL | WORD | WORD |
|---|---|---|---|
| 1 | 1 | | (~1,~2,~3)(~1,~2,3)(~1,~2,~4)(~1,4,5) |
| | ~1 | (~1,~2)(~1,3)(~1,~3)(~1,4)(~1,~4) | |
| 2 | 2 | | (~1,~2,~3)(~1,~2,3)(~1,~2,~4)(~1,3,~5) |
| | ~2 | (~1,~2)(~2,3)(~2,~3)(~2,~4)(~2,~5) | |
| ⋮ | ⋮ | ⋮ | ⋮ |
| n-1 | n-1 | | |
| | ~(n-1) | | |
| n | n | | |
| | ~n | | |

FIG. 3

| 2-VARIABLES | WORD | CLAUSE |
|---|---|---|
| 1,2 | 1,2 | |
| | 1,~2 | |
| | ~1,2 | |
| | ~1,~2 | (~1,~2,3)(~1,~2,~3)(~1,~2,~4) |
| 1,3 | 1,3 | |
| | 1,~3 | |
| | ~1,3 | (~1,~2,3) |
| | ~1,~3 | (~1,~2,~3) |
| ... | | |
| 2,3 | 2,3 | |
| | 2,~3 | |
| | ~2,3 | (1,~2,3)(~2,3,5) |
| | ~2,~3 | |
| ... | | |
| n-1,n | n-1,n | |
| | n-1,~n | |
| | ~(n-1),n | |
| | ~(n-1),~n | |

FIG. 4

| LITERAL RECOGNITION | EXPRESSION |
|---|---|
| 1-2 | (x) ∧ (~x, a) => (a) |
| 2-2 | (x, a) ∧ (~x, a) => (a) |
| WORD RECOGNITION | |
| 3-3 | (x, a, b) ∧ (~x, a, b) => (a, b) |
| 2-2-3 | (x, a) ∧ (y, a) ∧ (~x, ~y, b) => (a, b) |
| 2-3-3 | (x, y) ∧ (a, b, ~x) ∧ (a, b, ~y) => (a, b) |
| 3-3-3-3 | (a, b, x) ∧ (a, b, y) ∧ (a, b, z) ∧ (~x, ~y, ~b) => (a, b) |

FIG. 6

| LITERAL | WORD | CLAUSE | 4-NO |
|---|---|---|---|
| a | b | c, f | (d,e), |
|   | -b | ... | ... |
| -a | d | e | (b,c),(b,f) |
|   | -d | ... | ... |

FIG. 13

INVERSE FUNCTION METHOD OF BOOLEAN SATISFIABILITY (SAT)

BACKGROUND

Boolean Satisfiability (SAT) is a problem that has both academic and practical significance. For example, in industry, techniques for demonstrating Boolean Satisfiability are used to prove the correctness of digital logic circuits and for many other purposes. Although numerous algorithms for proving Boolean Satisfiability of formulas have been proposed and implemented, none of them can operate in polynomial time.

SUMMARY

Embodiments of the present invention include implementations, in a computer, of techniques for proving Boolean Satisfiability in polynomial ($kn$ to $kn^3$) time. Such computer implementations of embodiments of the present invention represent significant increases in efficiency over known techniques for solving Boolean Satisfiability problems. Embodiments of the present invention, therefore, include improved computing methodologies for proving Boolean Satisfiability more efficiently than was previously possible. Embodiments of the present invention may solve Boolean Satisfiability (SAT) problems using inverse function, knowledge learning (KL), and cognitive logic reasoning (CLR) technology.

The inverse function and knowledge learning technology may include a pair of hierarchical mirrored memories, also referred to as an "iterative set" in mathematical terminology. To determine whether a particular SAT formula is satisfiable or not, embodiments of the present invention may convert the disjunctive form of the SAT formula into its complement conjunction form and then store the SAT formula in the pair of hierarchical mirrored memories as a set of element-class relations. Embodiments of the present invention may use deduction and reduction technology to retrieve the element-class relations of the data from the pair of hierarchical mirrored memories.

Embodiments of the inverse function method may eliminate the need to use the Boolean OR operation, and use a set of rejection rules to reject data that are not satisfiable, and to delete the rejected data from the knowledge domain in the pair of hierarchical mirrored memories. Embodiments of the present invention may treat any data remaining in the pair of hierarchical mirrored memories as the range of assignments. Any such remaining data may be deemed by embodiments of the present invention to be satisfiable.

Embodiments of the present invention apply a 3-D relation method to categorize data into countable patterns, such as "joint," "difference," union," and "complement" relations, and determine the values of variables based on these patterns. In particular, the value determination method may use value determination rules to categorize unsatisfied elements within patterns and to generate new unsatisfied elements. The value determination rules may operate in single steps and thereby avoid unnecessary trial and error to determine whether the 3-SAT formula is satisfiable. In this way, embodiments of the present invention may determine, in polynomial ($kn$ to $kn^3$) time, whether the SAT formula is satisfiable or not.

For example, one embodiment of the present invention is directed to a method and/or system for performing the following functions in connection with a computer system:

storing, in a bijective set memory, storing data representing bidirectional relationships, comprising: storing data representing elements in an element memory of the bijective set memory; and storing data representing classes in a class memory of the bijective set memory;

using a parallel information processor to read input to the computer system and to perform set operations on the input to produce output representing results of the set operations;

using an induction module, under control of the parallel information processor, to use induction to learn relationships between the elements and the classes and to store data representing the learned relationships in the bijective set memory;

using a deduction module, under control of the parallel information processor, to receive data representing input perceptions and to use deduction to retrieve, from the bijective set memory, data representing conceptions having relationships to the input perceptions;

using a reduction module, under control of the parallel information processor, to receive data representing input conceptions and to use reduction to retrieve, from the bijective set memory, data representing perceptions having relationships to the input conceptions;

receiving data representing an input 3-SAT formula;

using the parallel information processor to determine whether the input 3-SAT formula is satisfiable, comprising:

using an inverse function to convert disjunctions of literals in the input 3-SAT formula into semantic equivalent conjunctions, thereby producing data representing a converted input 3-SAT formula;

controlling the induction module to learn relationships among elements of the converted 3-SAT formula;

organizing the learned relationships into a plurality of levels;

storing data representing the learned relationships in the bijective set memory according to the plurality of levels;

using the deduction module and the reduction module to apply a plurality of rejection rules to a knowledge domain associated with the converted input 3-SAT formula, and thereby to reject all elements of the converted input 3-SAT formula which are not satisfiable, thereby leaving a range of a remaining domain as the range of assignments;

determining whether the range of the remaining domain includes at least one assignment;

providing output indicating that the input 3-SAT formula is satisfiable in response to determining that the remaining domain includes at least one assignment; and providing output indicating that the input 3-SAT formula is not satisfiable in response to determining that the remaining domain does not include at least one assignment.

Other features and advantages of various aspects and embodiments of the present invention will become apparent from the following description and from the claims.

BRIEF DESCRIPTION OF THE DRAWINGS

FIG. 3 presents the relations among variables, literals, words, and clauses according to one embodiment of the present invention;

FIG. 4 presents the relations among 2-variable combinations, words, and clauses according to one embodiment of the present invention;

FIG. 6 presents the rules of rejection recognition according to one embodiment of the present invention;

FIG. 13 is a diagram illustrating 4-NOs resulting from applying pattern recognition to elements according to one embodiment of the present invention.

DETAILED DESCRIPTION

The present patent application relates to PCT Pat. App. Ser. No. PCT/US2014/032965, filed on Apr. 4, 2014, entitled, "A Polynomial Method of Constructing a Non-Deterministic (NP) Turing Machine." That patent application describes techniques for constructing a non-deterministic Turning machine (NTM) from a deterministic Turing machine (DTM). As described therein, a non-deterministic Turing machine may be thought of as a knowledge reasoning machine which works in a manner that is similar to the human brain. In each situation, a non-deterministic Turing machine may make many choices in parallel to move towards the solution of a problem. In contrast, a deterministic Turing machine is a transition function machine; that is, in any given situation, a deterministic Turing machine makes exactly one choice, and does not have the ability to pursue other choices in parallel. Therefore, the most significant difference between a deterministic Turing machine and a non-deterministic Turing machine is that the former cannot perform processing in parallel, while the latter can perform processing in parallel.

In general, nondeterministic Turing machines (NTMs) implemented according to the above-referenced patent application include four subsystems: (1) a spatial binary enumeration system; (2) a 3-dimensional relation system; (3) a simulated human logic system; and (4) a hierarchical bijective-set memory system. The above-referenced patent application provides further details about each such subsystem and about how such subsystems interact with each other.

Figure 1:
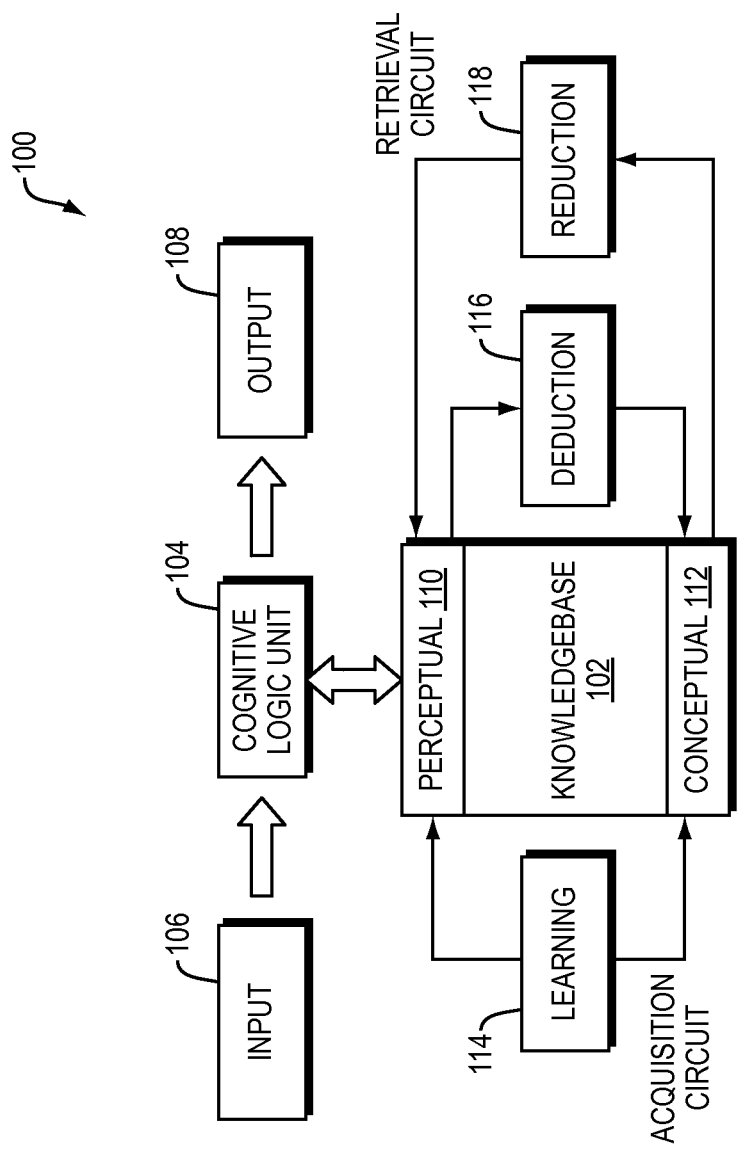
FIG. 1 is a diagram of a nondeterministic Turing machine according to one embodiment of the present invention.

For example, referring to FIG. 1, a diagram is shown of a nondeterministic Turing machine (NTM) 100 according to one embodiment of the present invention. The NTM 100 includes a memory 102, referred to herein as a "bijective set" memory, because it contains data representing bidirectional relationships, as will be described in more detail below. The memory 102 is also referred to herein as a "knowledgebase," as that term is used in U.S. Pat. No. 6,611,841. The NTM 100 also includes a simulated human logic system 104, which is also referred to herein as a cognitive logic unit or a parallel information processor. The cognitive logic unit 104 does not work in the same way as a conventional central processing unit (CPU). Rather, the cognitive logic unit 104 works as a "set operator," which causes the entire NTM 100 to work as a set operator. The cognitive logic unit 104 reads input 106 and, based on the input and the contents of the memory 102, produces output 108. For example, and as will be described in more detail below, the cognitive logic unit 104 may perform one or more set operations on its input 106 (e.g., deductively and/or reductively) to produce its output 108, which represents the result of performing the set operation(s) on the input 106. Since the NTM 100 is nondeterministic, the bijective set memory 102 may contain data representing relationships among data in the sense described above in the Background section. The entire NTM 100, however, may be implemented using a deterministic Turing machine (DTM). In such embodiments, the NTM 100 uses a DTM to perform the functions of an NTM. Therefore, the embodiment of invention may use a DTM to construct an NTM.

Examples of the bijective set memory 102, and of techniques for storing data in the bijective set memory, are described in more detail in U.S. Pat. No. 6,611,841, entitled, "Knowledge Acquisition and Retrieval Apparatus and Method," issued on Aug. 26, 2003; U.S. Prov. Pat. App. No. 61/798,848, entitled, "Sequence Alignment," filed on Mar. 15, 2013; and PCT App. No. PCT/US2014/027455, entitled, "Spatial Arithmetic Method of Sequence Alignment," filed on Mar. 14, 2014, all of which are hereby incorporated by reference herein.

A very brief summary of the bijective set memory 102 will be provided here. Further details are available in the above-referenced documents. In general, the bijective set memory 102 is based on an understanding of, and operates in a manner that is analogous to, the operation of the human brain. In particular, the bijective set memory 102 may contain two memories: a perceptual memory 110 and a conceptual memory 112. The perceptual memory 110 stores data representing perceptions, such as perceptions of objects. The conceptual memory 112 stores data representing conceptions (also referred to herein as concepts and classes). The conceptions represented by data stored in the conceptual memory 112 may be considered to be sets, while the perceptions represented by data stored in the perceptual memory 110 may be considered to be elements of the sets represented by the data stored in the conceptual memory 112.

The NTM 100 includes an induction module 114 (also referred to herein as a learning module or a concept formation module), which learns natural relationships between perceptions represented by data stored in the perceptual memory 110 and concepts represented by data stored in the conceptual memory 112, using a process of induction. For each relationship that the learning module 114 learns between a perception in the perceptual memory 110 and a corresponding concept in the conceptual memory 112, the learning module 114 generates and stores a two-way mapping between the data representing the perception in the perceptual memory 110 and the data representing the corresponding concept in the conceptual memory 112. The process performed by the learning module 114 of generating and storing such mappings for an increasingly large number of perceptions and corresponding concepts models the learning process performed by the human brain. The resulting set of mappings is an example of a "knowledgebase" as that term is used herein, and as that term is used in U.S. Pat. No. 6,611,841.

Once the learning module 114 has developed a knowledgebase containing two-way mappings between the perceptions represented by data stored in the perceptual memory 110 and the concepts represented by data stored in the conceptual memory 112, knowledge stored in the knowledgebase may be retrieved in any of a variety of ways. For example, the NTM 100 includes a deduction module 116 which may retrieve knowledge from the knowledgebase using deduction. In particular, if data representing a perception in the perceptual memory 110 is provided as input to the deduction module 116, then the deduction module 116 may follow the mapping(s) (i.e., relationships) from the perception in the perceptual memory 110 to the corresponding concept(s) in the conceptual memory 112, and thereby retrieve the concept(s) that correspond to the perception.

As another example, the NTM includes a reduction module 118 which may retrieve knowledge from the knowledgebase using reduction. In particular, if data representing a class (also referred to herein as a concept, conception, or set) in the conceptual memory 112 is provided as input to the reduction module 118, then the reduction module 118 may follow the mapping(s) from the concept in the conceptual memory 112 to the corresponding perception(s) in the perceptual memory 110, and thereby retrieve the perception(s) that correspond to the concept.

As mentioned above, NTMs implemented according to embodiments of the present invention include a spatial binary enumeration system, which refers to an enumeration system which enumerates numbers based on a set consisting of two fundamental (primitive) elements, which may be conceived of as representing +1 and −1.

Therefore, although the conventional binary number system also is based on two fundamental (primitive) elements, namely 0 and 1, the spatial binary enumeration system disclosed herein has a variety of advantages over the conventional binary number system that is based on 0 and 1. In particular, the spatial binary enumeration system disclosed herein is based on primitive elements having values that are equal in magnitude and opposite (i.e., complementary) in direction to each other, such as −1 and +1. In contrast, the primitive values of 0 and 1 in the conventional binary number system are not equal and opposite to each other. The spatial binary enumeration system's use of primitive values that are equal in value but opposite in direction to each other enables computations to be performed more efficiently than using the conventional binary number system.

As will be described in more detail below, the use of +1 and −1 as primitive values enables numbers represented as combinations of +1 and −1 to be represented as three-dimensional points in a three-dimensional space more easily and directly than numbers represented as combinations of +1 and 0. This further facilitates use of such numbers to perform arithmetic (such as multiplication, division, addition, or subtraction), factorization, and other arithmetic and logical operations more easily than conventional binary numbers composed of primitive values of 0 and 1.

Because the use of +1 and −1 to represent numbers is new, there is no existing terminology to refer to a number which has permissible values consisting of the set {+1, −1}. The existing term "bit" refers to a number which has a range of permissible values consisting of the set {+1, 0}. For ease of explanation, and because embodiments of the present invention may use either a representation based on {+1, 0} or {+1, −1}, the term "bit" will be used herein to refer both to numbers that have a range of permissible values consisting of the set {+1, 0} and to numbers that have a range of permissible values consisting of the set {+1, −1}. Similarly, the term "binary number" will be used herein to refer to any number consisting of bits, whether such bits have a range of {+1, 0} or {+1, −1}. For example, both the number 10011010 and the number +1−1−1+1+1−1+1−1 will be referred to herein as "binary numbers," even though the number +1−1−+1 1 1+1+ 1−1+1−1 does not contain "bits" in the conventional sense. The term "spatial binary number" will be used to refer specifically to numbers containing bits having a range of {+1, −1} when it is desired to refer to such numbers specifically.

As mentioned above, NTMs implemented according to embodiments of the present invention include a 3-dimensional relation system. Such a system is described in detail in U.S. patent application Ser. No. 14/191,384, filed on Feb. 26, 2014, entitled, "Spatial Arithmetic Method of Integer Factorization." Therefore, the three-dimensional relation system will not be described in more detail herein.

As further mentioned above, NTMs according to embodiments of the present invention include a simulated human logic system. Simulated human logic systems implemented according to embodiments of the present invention are built on the recognition that there is a natural order to the three-dimensional relation system and to knowledge more generally. For example, the human brain naturally sorts information in order to organize it. Similarly, nature automatically connects proteins to each other in certain orders and not others. Similarly, logic systems implemented according to embodiments of the present invention automatically organize information into relations within the bijective set memory 102.

The cognitive logic unit 104 may perform a variety of functions, such as the induction, deduction, and reduction functions disclosed above in connection with the learning module 114 (which learns and stores relations), deduction module 116 (which maps element information to set information), and reduction module 118 (which maps set information to element information) in FIG. 1. For example, the cognitive logic unit 104 may receive input 106 (such as input received from a user of the NTM 100). In response to receiving the input 106, the cognitive logic unit 104 may control the learning module 114 to perform induction on the input 106 (and possibly on previous inputs received by the NTM 100 and/or on data already stored in the knowledgebase 102), and thereby to create and store new learned knowledge in the knowledgebase 102. The cognitive logic unit 104 may then produce output 108 based on the new learned knowledge, such as output representing a concept that the induction module 114 learned based on the input 106.

As another example, in response to receiving the input 106, the cognitive logic unit 104 may control the deduction module 116 to perform deduction on the input 106 (and possibly on previous inputs received by the NTM 100 and/or on data already stored in the knowledgebase 102), and thereby to extract existing data from the knowledgebase 102 representing one or more classes of which an object represented by the input 106 is a member. The cognitive logic unit 104 may then produce output 108 based on the result of the deduction, such as output representing a class which contains an object represented by the input 106.

As another example, in response to receiving the input 106, the cognitive logic unit 104 may control the reduction module 118 to perform reduction on the input 106 (and possibly on previous inputs received by the NTM 100 and/or on data already stored in the knowledgebase 102), and thereby to extract existing data from the knowledgebase 102 representing one or more objects which are members of a class represented by the input 106. The cognitive logic unit 104 may then produce output 108 based on the result of the reduction, such as output representing one or more objects which are members of a class represented by the input 106.

As these examples illustrate, the cognitive logic unit 104 may trigger one or more of the learning module 114, the deduction module 116, and the reduction module 118 to perform their respective functions on the input 106, and the cognitive logic unit 104 may produce output 108 based on the results of the functions performed by such modules. The cognitive logic unit 104 may, therefore, act as an interface between a user of the NTM 100 and the modules 114, 116, and 118. The cognitive logic unit 104 may, therefore, also act as a controller of the modules 114, 116, and 118. The cognitive logic module 104 may retrieve data (representing existing knowledge) from the knowledgebase 102 using the modules 114, 116, and 118. Furthermore, the cognitive logic module 104 may store data (representing new knowledge) in the knowledgebase 102 using the modules 114, 116, and 118.

Logic systems implemented in the cognitive logic unit 104 according to embodiments of the present invention perform a variety of functions and provide a variety of benefits. For example, such logic systems enable knowledge to be learned automatically in the manner disclosed herein. In natural language and natural numbers there exist natural relations and natural logic. Humans can perceive these hidden relations automatically, but current computers are not equipped to process these relations. The cognitive logic unit 104 provides the ability to recognize natural relations, such as natural relations expressed in natural languages and natural numbers. As another example, the cognitive logic unit 104 enables knowledge to be processed in parallel. As yet another example, the cognitive logic unit 104 eliminates most of the traditional task of "programming," by replacing programming with the process of learning and then of extracting learned knowledge. For example, the cognitive logic unit 104 may extract knowledge from the knowledgebase 102 without programming as follows. The NTM 100 of FIG. 1 may receive input 106, and then:

the cognitive logic unit 104 may apply deduction 116 to the input 106 to extract existing knowledge from the knowledgebase 102 representing one or more concepts associated in the knowledgebase 102 with the presented data; and/or the cognitive logic unit 104 may apply reduction 116 to the input 106 to extract existing knowledge from the knowledgebase 102 representing one or more objects (perceptions) associated in the knowledgebase 102 with the presented data.

In either case, no special programming need to be performed on the NTM 100 to enable concepts or perceptions to be extracted from the knowledgebase 102. Instead, the operations of deduction 116 and/or reduction 118 may be applied to the input 106 to extract concepts and perceptions without writing a separate program.

The cognitive logic unit 104 may perform set operations on output generated by the deduction module 116 and/or the reduction module 118. For example, the cognitive logic unit 104 may receive one or more outputs from either or both of the deduction module 116 and the reduction module 118, and then perform one or more set operations on such output. Examples of such set operations include intersection, union, difference, and complement operations. The cognitive logic unit 104 may then produce output representing the outcome of performing such a set operation or operations. As a simple example, consider the following:

the reduction module 116 is provided with an input representing the class of mammals and performs reduction on that input to produce output representing one or more animals which are mammals, based on the relations stored in the knowledgebase 102;

the reduction module is provided with an input representing the class of animals which live in the ocean and performs reduction on that input to produce output representing one or more animals which live in the ocean, based on the relations stored in the knowledgebase 102.

Figure 2:
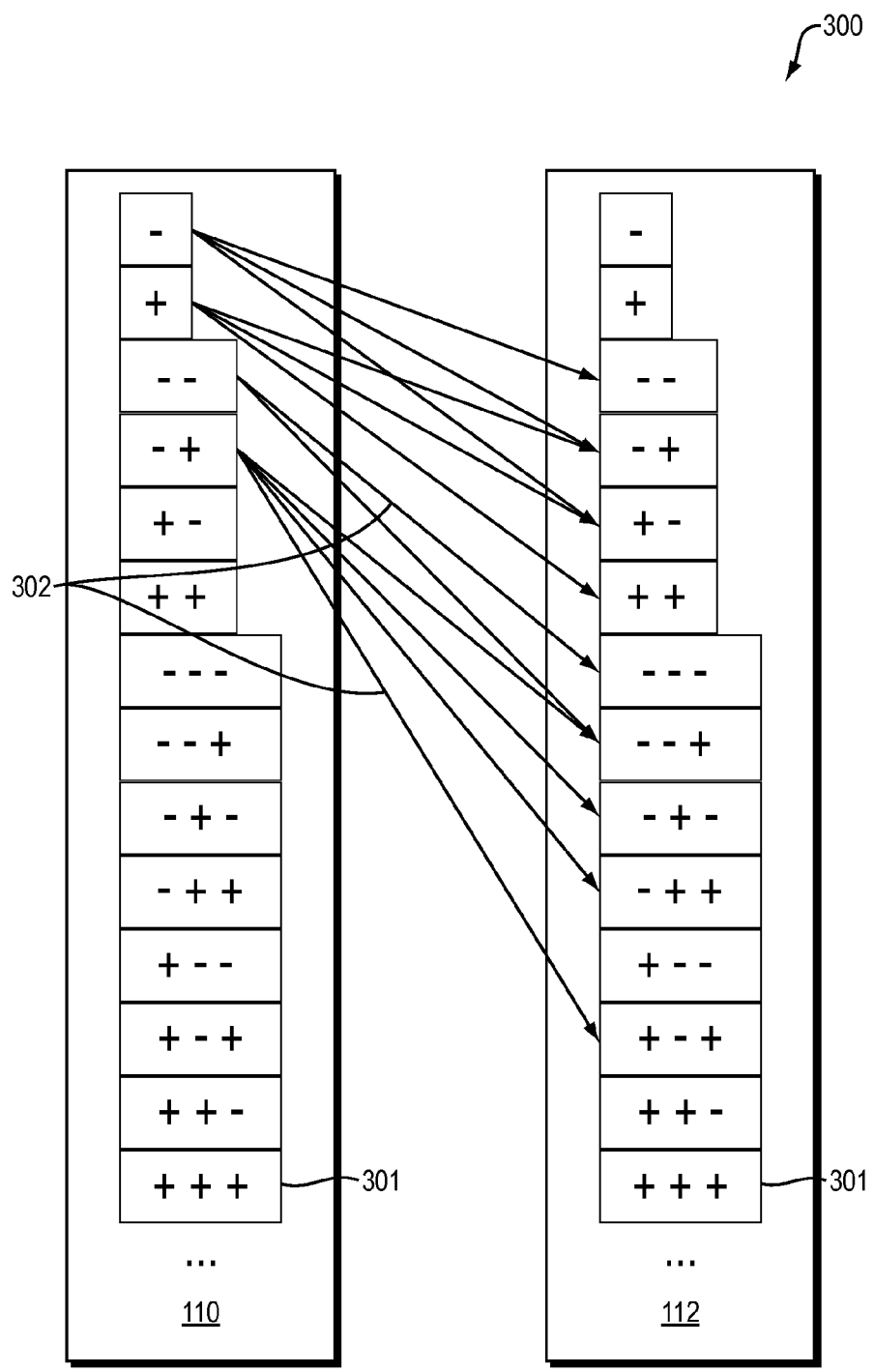
FIG. 2 is a diagram illustrating a bijective-set memory according to one embodiment of the present invention.

Of particular relevance to the present invention is the bijective-set memory 102, one embodiment of which is shown in more detail in FIG. 2 as bijective-set memory 300. The bijective-set memory 300 of FIG. 2 may be used to implement some or all of the knowledgebase 102 of FIG. 1. In the embodiment of FIG. 2, the bijective-set memory 300 includes two memories: memory 110 storing element information (also referred to as "object" information and "perception" information), and memory 112 storing set information (also referred to as "class" information, "concept" information, and "conceptual" information). Relations 301 indicate a 1 to 1 correlation between memories 110 and 112. This 1 to 1 correlation 301 indicates that the two memories 110 and 112 function like mirrors, although memory 110 is an object (element) memory and memory 112 is a class memory. Relations 302 indicate "belonging" relations, such as (− +) belongs to (− + +) and (+ − +). The bijective-set memory 300 is in an iterative structure, which contains elements that belong to sets. As a result, the data stored in the bijective-set memory 300 is also referred to as an iterative set. That is, the elements stored in the first level of the memory 300 are −1 and +1. These lowest-level (primitive) elements in the memory 300 are also referred to herein as "literals," "letters," or "characters." The elements stored in the second level of the memory 300 are combinations of two letters (e.g., (− +), (− −)), which are referred to herein as "words." Characters in the first level belong to specific words in the second level. The elements stored in the third level of the memory 300 are three-letter combinations, such as (− + −) and (+ + −), which are referred to herein as "clauses" or "triplets." Words in the second level belong to specific triplets in the third level. Elements stored at any level in the memory 300 above the third level may be represented as combinations of triplets. One of the advantages this method provides is a novel folded-graph data structure. This folded-graph data structure is able to process NP-problems as two-directional mappings instead of as a one-way function. Therefore, this method is able to solve NP-problem in polynomial time.

Embodiments of the present invention may be used to solve Boolean satisfiability problems in polynomial (kn to kn$^3$) time. If it is desired to determine whether a particular 3-SAT formula is satisfiable, such a formula (referred to herein as the "input formula") may be encoded into a suitable data structure, stored in a non-transitory computer-readable medium, and provided as input 106 to the cognitive logic unit 104 of the nondeterministic Turing machine (NTM) 100 of FIG. 1. In other words, one example of the input 106 is a formula whose satisfiability is desired to be determined. The NTM 100 may apply techniques disclosed herein to determine, in polynomial (kn to kn$^3$) time, whether the input formula 106 is satisfiable. The NTM 100 may provide, as output 108, a data structure, stored in a non-transitory computer-readable medium, indicating whether the input formula 106 is satisfiable. In other words, one example of the output 108 is data indicating whether the input formula 106 is satisfiable. Examples of specific techniques for determining whether the input formula 106 is satisfiable will now be described.

Embodiments of the present invention apply a method of an inverse function, which converts any disjunction(s) of literals in the input formula 106 into their semantic equivalent conjunction(s). The resulting converted input formula 106, which may be expressed in conjunctive normal form (CNF), may then be processed by embodiments of the present invention using the techniques disclosed herein. This technique eliminates any and all Boolean OR operators from the input formula 106. More specifically, if a 3-SAT formula contains m disjunctive clauses, each such disjunctive clause may be represented by a set of eight conjunctive clauses including one complement. For example, disjunctive clause ($x_1$ ∨ $x_2$ ∨ ~$x_3$) may be represented by a set of eight conjunctive clauses:

($x_1$ ∧ $x_2$ ∧ $x_3$)
($x_1$ ∧ $x_2$ ∧ ~$x_3$)
($x_1$ ∧ ~$x_2$ ∧ $x_3$)
($x_1$ ∧ ~$x_2$ ∧ ~$x_3$)
(~$x_1$ ∧ $x_2$ ∧ $x_3$)
(~$x_1$ ∧ $x_2$ ∧ ~$x_3$)
(~$x_1$ ∧ $x_2$ ∧ $x_3$)
(~$x_1$ ∧ ~$x_2$ ∧ ~$x_3$)

Note that any reference herein to the input 3-SAT formula 106 should be understood to refer equally to the converted 3-SAT formula which results from the conversion process described above.

In the above, (~$x_1$ ∧ ~$x_2$ ∧ $x_3$) is a complement of ($x_1$ ∨ $x_2$ ∨ ~$x_3$). Clause ($x_1$ ∨ $x_2$ ∨ ~$x_3$) means that (~$x_1$ ∧ ~$x_2$ ∧ $x_3$) is not satisfiable, and that the rest of the conjunctive clauses are satisfiable. Elimination of the Boolean OR operator simplifies and unifies information processing performed by embodiments of the inverse function of the present invention, and enables reversibility of one-way functions. One-way functions (http://en.wikipedia.org/wiki/One-way_function) have been the only known function for solving 3-SAT problems until the development of the present invention.

The inverse function used by embodiments of the present invention identifies patterns of relations between the elements of unsatisfied data expressed in a conjunctive form instead of in a disjunctive form. Therefore the inverse function used by embodiments of the present invention eliminates the uncertainty of current statistical algorithms and is able to process information with certainty. More specifically, embodiments of the present invention relate unsatisfied elements to each other continually, and this continuity of relations forms countable patterns. Embodiments of the present invention may recognize these patterns directly and quickly, and thereby avoid repeated trial and error. In contrast, conventional methods based on the disjunctive form cannot avoid engaging in repeated trial and error, which may cause such methods to engage in an exponentially growing number of steps.

Embodiments of the present invention may use an inverse function to organize the input 3-SAT formula 106 into a plurality of (e.g., five) levels of classes and the relations among them in the iterative set memory 102 of FIG. 1. For ease of explanation, the levels are described herein, from top to bottom, as the "formula," "clause," "word," and "literal," levels. Each 3-SAT input formula 106 contains a countable size of clauses. Each clause contains three words. For example, clause (~$x_1$ ∧ ~$x_2$ ∧ $x_3$) contains three words as its elements: (~$x_1$ ∧ ~$x_2$), (~$x_1$ ∧ $x_3$), and (~$x_2$ ∧ $x_3$).

Each word belongs to multiple clauses. As a result, multiple clauses may contain the same word. Each word contains two literals (variable values) as its elements.

For purposes of the following description, assume that the input formula 106 is the following 3-SAT formula: (~1 ∧ ~2 ∧ ~3) (~1 ∧ ~2 ∧ 3) (~1 ∧ ~2 ∧ ~4) (~1 ∧ 4 ∧ 5) (~2 ∧ 3 ∧ ~5).

Referring FIG. 3, the variable-literal relation level contains relations between variables and literals, wherein the elements of the literal class are the values of the variables. The relation between literals and variables are in sequence order in the knowledgebase 102.

As illustrated in FIG. 3, the literal 1 does not belong to any word or clause in the input formula 106, because the literal 1 is not contained within the input formula 106. As further shown in FIG. 3, the literal ~1, which is contained within the input formula 106, is contained in the following words of the input formula 106: (~1, ~2), (~1, 3), (~1, ~3), (~1, 4), and (~1, ~4). As further shown in FIG. 3, the literal ~1 is contained in the following clauses of the input formula 106: (~1, ~2, ~3), (~1, ~2, 3), (~1, ~2, ~4), and (~1, 4, 5).

As further shown in FIG. 3, the literal 2 does not belong to any word or clause in the input formula 106, because the literal 2 is not contained within the input formula 106. As further shown in FIG. 3, the literal ~2, which is contained within the input formula 106, is contained in the following words of the input formula 106: (~1, ~2), (~2, 3), (~2, ~3), (~2, ~4), (~2, ~5). As further shown in FIG. 3, the literal ~2 is contained in the following clauses of the input formula 106: (~1, ~2, ~3), (~1, ~2, 3), (~1, ~2, ~4), and (~2, 3, ~5).

The relations of the literals 3, ~3, 4, ~4, 5, and ~5 in the input formula 106 are omitted from FIG. 3, merely for ease of illustration. Those having ordinary skill in the art will appreciate, based on the description herein and FIG. 3, how to identify the relations between the literals 3, ~3, 4, ~4, 5, and ~5 in the input formula 106 and words and clauses in the input formula 106.

As illustrated by FIG. 3, the literal-word relation level contains relations between literals and words, wherein the elements of the word class are literals. Each word contains two literals, and belongs to multiple clauses. Each combination of two variables can combine into four words. The relations among literals, 2-variable combinations, and words may be stored in sequence order in the knowledgebase 102 in order to facilitate efficient storage and retrieval of such relations from the knowledgebase 102.

Referring FIG. 4, the word-clause relation level contains relations between words and clauses, wherein the elements of each clause is a set of three words. Each word belongs to multiple clauses. The relations between words and clauses may be stored in sequence order in the knowledgebase 102.

As one example illustrated in FIG. 4, the word (~1, ~2) in the input formula 106 is contained in the following clauses of the input formula 106: (~1, ~2, 3), (~1, ~2, ~3), and (~1, ~2, ~4).

As illustrated in FIGS. 3 and 4, information about the relations among variables, literals, words, and clauses within the input 3-SAT formula 106 may be learned and stored as iterative element-class relations in the bi-directional retrievable knowledgebase 102. The deduction module 116 of the NTM 100 may be used to retrieve data stored in the knowledgebase 102, such as by retrieving data representing the class(es) to which a particular element (e.g., variable, literal, word, or clause) belongs, in response to receiving data representing that element as input. Note that a "class" may, for example, be a word, clause, or formula. For example, in relation to a literal, a word, clause, or formula is an example of a class to which the literal may belong. In relation to a word, a clause of formula is an example of a class to which the literal may belong. In relation to a clause, a formula is an example of a class to which the formula may belong.

The reduction module 118 of the NTM 100 may be used to retrieve data stored in the knowledgebase 102, such as by retrieving data representing the element(s) (e.g., variables, literals, words, and/or clauses) contained within a particular class, in response to receiving data representing that class as input.

Figure 5:
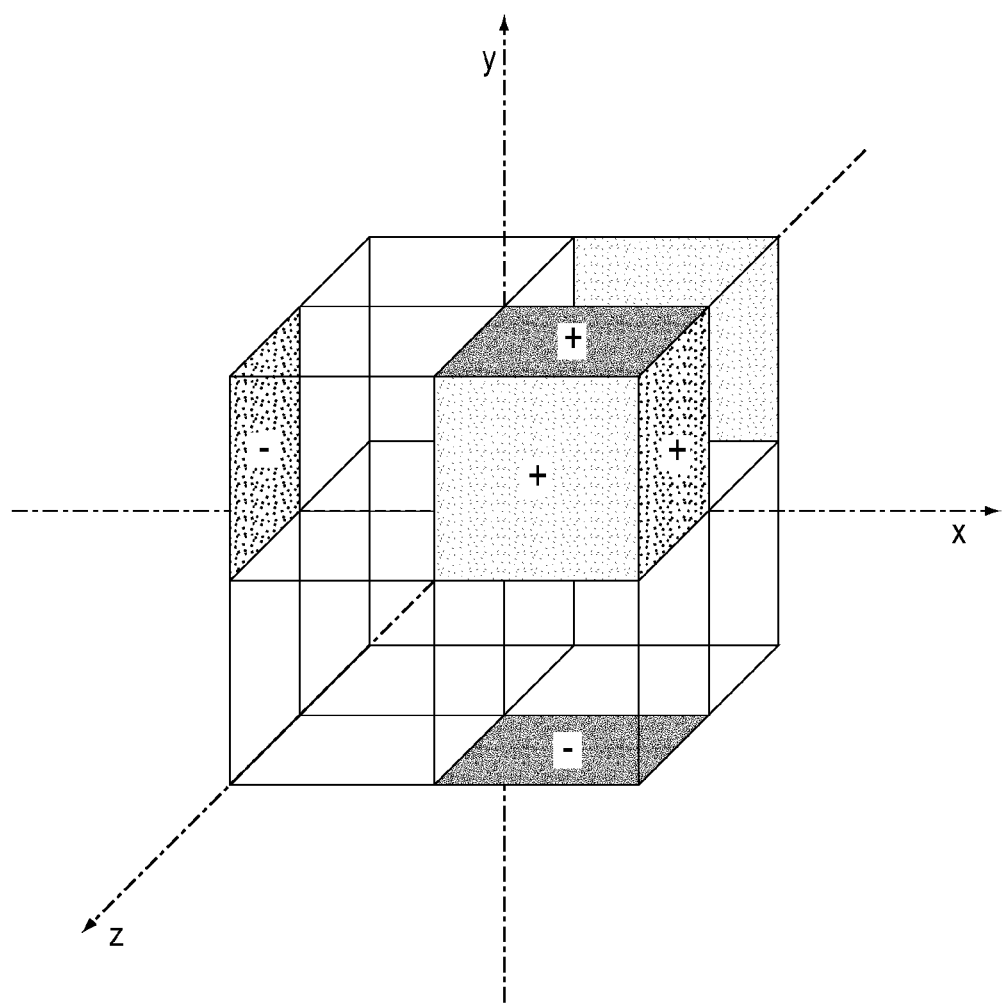
FIG. 5 presents the 3-dimensional correlate system as the domain of 3-SAT according to one embodiment of the present invention.

Referring FIG. 5, the input 3-SAT formula 106 may be represented in the knowledgebase 102 in a domain of a 3-dimensional coordinate system, wherein each 3-dimensional coordinate represents a clause; each 2-dimensional coordinate represents a word; and each 1-dimensional coordinate represents a variable. Each pair of complementary literals represents two values of a variable.

As is well-known, a 3-SAT formula is satisfiable if and only if there is at least one assignment of Boolean values (i.e., TRUE/FALSE) to all the variables in the 3-SAT formula which causes the 3-SAT formula as a whole to be true. If there is at least one set of such assignments, then the 3-SAT formula is said to be satisfiable; if there is no such a set of assignments, then the 3-SAT formula is said not to be satisfiable (or to be unsatisfiable). As will be described in more detail below, the NTM 100 of FIG. 1 may be used to reject all the elements (e.g., variables, literals, words, and/or clauses) of the input formula 106 which are not satisfiable, thereby leaving the range of the remaining domain as the range of the assignments. In other words, the NTM 100 leaves, as the remaining elements of the knowledge domain that is associated with the input formula 106, only those elements which are satisfiable. If any two values of a variable in the input formula 106 are rejected by the NTM 100, then the input formula 106 has no assignment; otherwise, the input formula 106 has at least one assignment. The assignment is the union of the words remaining in the knowledge domain that is associated with the input formula 106. If multiple words remain in the knowledge domain that is associated with the input formula 106, then the input formula 106 has multiple assignments.

The NTM 100 may determine, after rejecting any and all unsatisfiable elements from the knowledge domain that is associated with the input formula 106, whether the input formula 106 as a whole has one or more set of assignments which cause the input formula 106 to be true. An assignment of values to variables in a 3-SAT formula which causes the 3-SAT formula to be true is referred to herein as a "satisfiable assignment," whereas an assignment of values to variables in a 3-SAT formula which causes the 3-SAT formula to be false is referred to herein as an "unsatisfiable assignment" or a "nonsatisfiable assignment." If the NTM 100 determines that the input formula 106 has one or more such assignments, then the NTM 100 may conclude that the input formula 106 is satisfiable, and may provide output 108 indicating that the input formula 106 is satisfiable. If the NTM 100 determines that the input formula 106 does not have any such assignments, then the NTM 100 may conclude that the input formula 106 is not satisfiable, and may provide output 108 indicating that the input formula 106 is not satisfiable.

Referring FIG. 6, the NTM 100 may apply any of a variety of rejection rules to the input 3-SAT formula 106 to reject one or more elements from the input 3-SAT formula 106. More specifically, the NTM 100 may apply each of a plurality of rejection rules to each of a plurality of elements in the knowledge domain that is associated with the input 3-SAT formula 106. Examples of elements in the knowledge domain that is associated with the input 3-SAT formula 106 are variables, literals, words, and clauses. The result of applying a particular rejection rule to a particular element in the knowledge domain that is associated with the input 3-SAT formula 106 is a determination, by the NTM 100, of whether to reject that particular element. If the NTM 100 determines that a particular element should be rejected, the NTM 100 rejects that element and removes it from the knowledge domain that is associated with the input 3-SAT formula 106. The NTM 100 may apply each of a plurality of rejection rules to each of one or more elements in the NTM 100.

The NTM 100 applies the rejection rules to the knowledge domain that is associated with the input 3-SAT formula 106 using the deduction module 116 and the reduction module 118. The deduction module 116 receives, as an input, data representing a particular element (such as a particular literal, word, or clause) and identifies, based on data representing relations stored in the knowledgebase 102, any classes to which the particular element belongs. The deduction module 116 provides output representing such classes. Note that the output of the deduction module 116 may indicate that the particular element is a member of one or more classes, where a class may be a word, a clause, or a formula.

The reduction module 118 receives, as an input, data representing a particular class (such as a particular clause, word, or literal) and identifies, based on data representing relations stored in the knowledgebase 102, any particular elements which are members of the particular class. The reduction module 118 provides output representing such particular elements. Note that the output of the reduction module 118 may indicate that the particular class does not have any elements as members, or may identify one or more elements which are members of the particular class, where the elements may be clauses, words, or literals.

Each time unsatisfied elements are rejected new relationships can be recognized back and forth by deductive and reductive reasoning. For example:

A literal (−1) is rejected if the literal (1) has become the only variable value possible to be satisfied.

As another example, if (1,2,3) is an unsatisfied clause, then the clause (1,2,3) is deductively associated with the literal (1), and a new relation (2,3) can be determined as a new unsatisfied word.

As another example, if the words (1,2,3) and (1,2,−3) are rejected, then their reductive association (1,2) can be determined as a new unsatisfied relation.

The above cases are merely examples and do not constitute limitations of the present invention. Those having ordinary skill in the art will understand how to apply embodiments of the present invention to other examples.

By applying deductive and reductive reasoning, embodiments of the present invention are able to recognize all of the unsatisfied elements in the knowledge domain that is associated with the input 3-SAT formula. As a result of using these inverse functions, the iterative relations among the formula, clauses, words, literals and variables can be processed from the top level to the bottom level, and from the bottom level to the top level in linear time. Examples of rejection rules that may be applied by the NTM 100 to the input 3-SAT formula are described below.

The following description provides examples of rejection rules that may be applied by the NTM 100 to the knowledge domain that is associated with the input 3-SAT formula 106. The NTM 100 may apply any one or more of these rejection rules to each of any one or more elements of the knowledge domain that is associated with the input 3-SAT formula 106. The following rejection rules are merely examples. Embodiments of the present invention may apply one or more rejection rules in addition to those described below. Similarly, embodiments of the present invention need not apply all of the rejection rules described below.

In the description below, the term "rejected element (e.g., "rejected literal," "rejected word," and "rejected clause") refers to an element which at least one rejection rule applied by the NTM 100 determines to be rejected. A rejected element may be an element that the NTM 100 has already determined to be rejected according to one or more rejection rules, or may be an element that has not been determined by the NTM 100 to be rejected according to one or more rejection rules, but which should be rejected according to one or more rejection rules.

Figure 7:
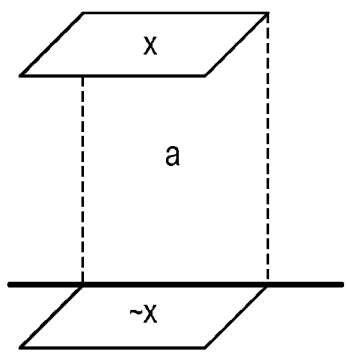
FIG. 7 presents 1-2 rule of literal rejection according to one embodiment of the present invention.

FIG. 7 illustrates a "1-2 literal" rejection rule, according to which a literal (a) is rejected if a rejected literal (x) is a complement to the literal (~x) of a rejected word (~x, a).

Figure 8:
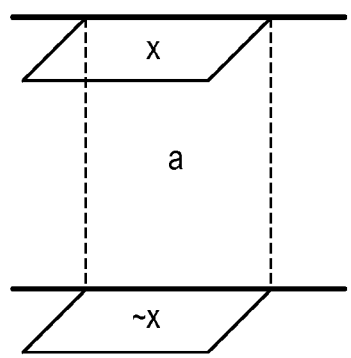
FIG. 8 presents 2-2 rule of literal rejection according to one embodiment of the present invention.

FIG. 8 illustrates a "2-2 literal" rejection rule, according to which a literal (a) is rejected if:
  the literal (a) is an intersection of two rejected words (x, a) and (~x, a); and
  the differences (x) and (~x) are complementary to each other.

Figure 9:
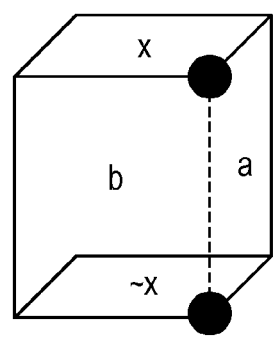
FIG. 9 presents 3-3=2 rule of word rejection according to one embodiment of the present invention.

FIG. 9 illustrates a "3-3 word" rejection rule, according to which a word (a, b) is rejected if:
  a literal (x) of a rejected clause (x, a, b) is a complement to the literal (~x) of the rejected clause (~x, a, b); and
  the word (a, b) is an intersection of clauses (x, a, b) and (~x, a, b).

Figure 10:
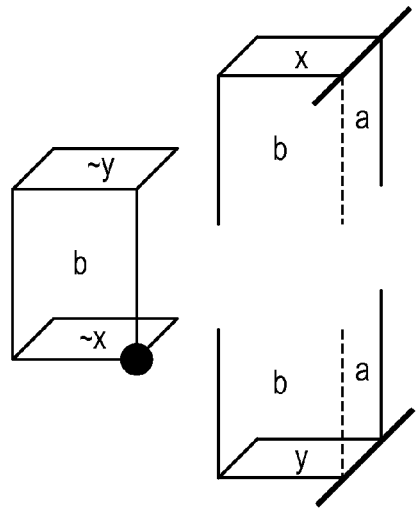
FIG. 10 presents 2-2-3 rule of word rejection according to one embodiment of the present invention.

FIG. 10 illustrates a "2-2-3 word" rejection rule, according to which a word (a, b) is rejected if:
  one literal (x) of a rejected word (x, a) and one literal (y) of another rejected word (y, a) are complements to the literals (~x) and (~y) of a rejected clause (~x, ~y, b), and
  the literal (a) is an intersection of the two words (x,a) and (y,a).

Figure 11:
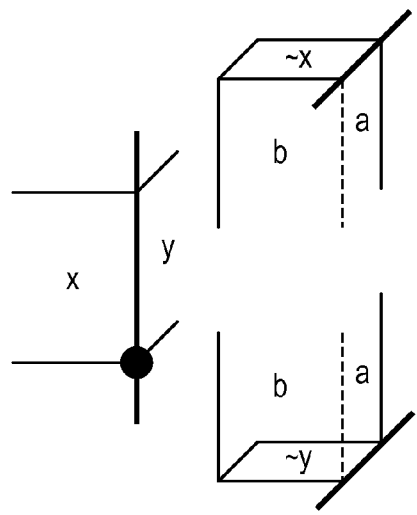
FIG. 11 presents 2-3-3 rule of word rejection according to one embodiment of the present invention.

FIG. 11 illustrates a "2-3-3 word" rejection rule, according to which a word (a, b) is rejected if:
  two literals (x) and (y) of one rejected word (x, y) are complements to the literal (~x) and (~y) of two rejected clauses (a, b, ~x) and (a, b, ~y), and
  the word (a, b) is an intersection of the two clauses.

Figure 12:
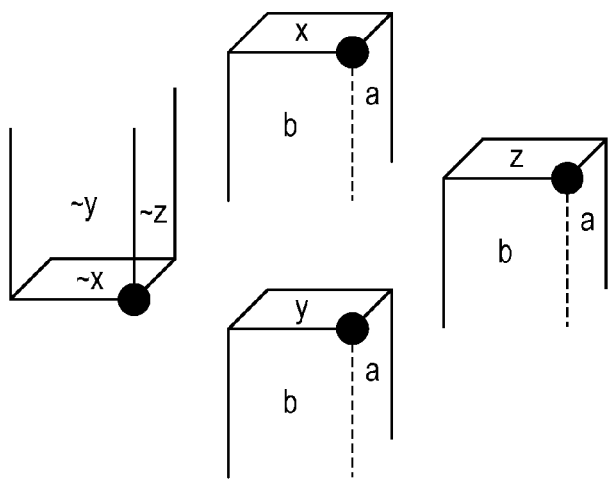
FIG. 12 presents 3-3-3-3 rule of word rejection according to one embodiment of the present invention.

FIG. 12 illustrates a "3-3-3-3 word" rejection rule, according to which the word (a, b) is rejected if:
  threes literal (x), (y), and (z) of three rejected clauses (a, b, x), (a, b, y), and (a, b, z) are complements to the literals (~x), (~y), and (~z) of a rejected clause (~x, ~y, ~z), and
  the word (a, b) is an intersection of the three rejected clauses.

According to certain embodiments of the present invention, elements in the knowledge domain that is associated with the input 3-SAT formula 106 may be assigned to points having coordinates in a 3-dimensional geometry space. That is, both the satisfied and unsatisfied values of the variables are ranged in this 2N-digit (two values of each variable) 3-D domain. In some cases, such points may form a Mobius strip, in which case satisfiable assignments may traverse a path to non-satisfiable assignments, in a loop. Embodiments of the present invention may use a 3-D relation method to determine whether any particular input 3-SAT formula forms such a Mobius strip and therefore is not satisfiable. Embodiments of the 3-D relation method may "recognize" each and all the variables, literals, words and clauses to their 3-D coordinates. Therefore, embodiments of the 3-D relation method may apply the relations among the elements of the knowledge domain in a specific order (e.g., x-y-z-x-y-z, etc.) to avoid redundancy of the algorithm of search.

Recall that in the present example, the input 3-SAT formula 106 is (~1 ∧ ~2 ∧ ~3) (~1 ∧ ~2 ∧ 3) (~1 ∧ ~2 ∧ ~4) (~1 ∧ 4 ∧ 5) (~2 ∧ 3 ∧ ~5). Elements of this formula 106 which each may be assigned to a point in 3-dimensional space are (~1x,~2y,~3z), (~1x,~2y,3z,), (~1x,~2y,~4z), (~1x,4z, 5y), and (~2y,3z,~5x). Each such set of coordinates may have an x coordinate, a y coordinate, and a z coordinate, in a specific order. The NTM 100 may assign each such element to a set of coordinates in three dimensional space and store a relation between the element and its 3-dimensional coordinates in the knowledgebase 102.

The NTM 100 may determine whether a particular input 3-SAT formula forms a Mobius strip by applying knowledge of the complements of variables. The NTM 100 may determine that a particular input 3-SAT formula 106 forms a Mobius strip if the set of 3-dimensional coordinates representing the particular input 3-SAT formula satisfies the conditions of the Mobius strip.

If the NTM 100 determines that the input 3-SAT formula 106 satisfies the conditions of the Mobius strip, then the NTM 100 may determine that the input 3-SAT formula 106 is not satisfiable, and may provide output 108 indicating that the input 3-SAT formula 106 is not satisfiable. If the NTM 100 does not determine that the input 3-SAT formula 106 satisfies the condition of Mobius structure, then the NTM 100 may determine that the input 3-SAT formula 106 is satisfiable, and may provide output 108 indicating that the input 3-SAT formula 106 is satisfiable and the remaining elements of the knowledge domain can be delivered as the solution or solutions to the input 3-SAT formula 106.

The 3-D relation methodology of embodiments of the present invention may be used to provide the advantage of being able to perform pattern recognition. In particular, the 3-D relation methodology may be used to organize all of the data at all of the levels (literal, word, and clause) of the knowledgebase 102 within countable patterns such as "joint," "difference," "union", and "complement" relations. That is, all data at each level in the knowledgebase 102 may be represented and categorized as countable patterns. Words may be represented within four and only four categorizations, namely (a,b), (a,~b), (~a,b) and (~a,~b). Clauses are presented within eight and only eight categorizations, namely (a,b,c), (a,b,~c), (a,~b,c), (a,~b,~c), (~a,b,c), (~a,b,~c), (~a,~b,~c) and (~a,~b, ~c). Embodiments of the present invention organize the patterns in the knowledgebase 102, and use only one step to "recognize" each such pattern. In contrast, conventional search methods organize patterns as functions in the data storage, and require multiple steps to process the search.

Embodiments of the present invention also apply a method of value determination based on the method of pattern recognition. This value determination method takes advantage of the method of pattern recognition and a set of specific value determination rules. For example, unsatisfied clauses (a,b,c), (a,b,f), and (~a,d,e) shown in FIG. 13 are categorized as a pattern referred to herein as "0-intersection/1-complements/ 4-differences", which generates two new unsatisfied clauses (b,c,d,e) and (b,f,d,e). Such a four-literal-clause is an example of what is referred to herein as a 4-NO. In the knowledge structure shown in FIG. 13 the present pattern recognition method may recognize the complement relation between (a) and (~a); the differences (c) and (f) between the two clauses (a,b,c) and (a,b,f); and the intersection (a,b) between the two clauses (a,b,c) and (a,b,f). The union between (b,c) and (d,e) is a 4-NO (b,c,d,e).

As another example, unsatisfied clauses (1,2,3), (1,~2,4), and (~1,2,5) may be categorized by embodiments of the present invention as a pattern referred to herein as a "crossing position". A crossing position is a structure which may result in a Mobius strip if four directions of four strips are independent in a three dimensional space. The present method may assign (1,2), (1,~2), (~1,2), and (~1,~2) four word values to each strip of "crossing position" as YES respectively to determine if any "crossing position" causes a Mobius strip. The method of value determination implemented according to embodiments of the present invention:

recognizes each pattern;
assigns values respectively to each variable according to the rules;
determines if the specific formula causes a Mobius strip; and
if the specific formula causes a Mobius strip, determines that there is no solution to the input 3-SAT formula;
if the specific formula does not cause a Mobius strip, determines that there is at least one solution to the input 3-SAT formula. The solution is the combination(s) of the remaining elements of the domain.

One advantage of the value determination method described above is that it is able to avoid unnecessary "trial and error" process steps, and instead directly identifies satisfied values in a fixed amount of time, thereby increasing the efficiency of the 3-SAT algorithm to a polynomial level of efficiency.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:
1. A computer system comprising:
a bijective set memory for storing data representing bidirectional relationships, wherein the bijective set memory comprises:
an element memory for storing data representing elements; and
a class memory for storing data representing classes;
a parallel information processor comprising means for reading input to the computer system and means for performing set operations on the input to produce output representing results of the set operations;
an induction module, under control of the parallel information processor, comprising means for using induction to learn relationships between the elements and the classes and for storing data representing the learned relationships in the bijective set memory;
a deduction module, under control of the parallel information processor, for receiving data representing input perceptions and for using deduction to retrieve, from the bijective set memory, data representing conceptions having relationships to the input perceptions;
a reduction module, under control of the parallel information processor, for receiving data representing input conceptions and for using reduction to retrieve, from the bijective set memory, data representing perceptions having relationships to the input conceptions;
means for receiving data representing an input 3-SAT formula;
wherein the parallel information processor further comprises means for determining whether the input 3-SAT formula is satisfiable, comprising:
means for using an inverse function to convert disjunctions of literals in the input 3-SAT formula into semantic equivalent conjunctions, thereby producing data representing a converted input 3-SAT formula;
means for controlling the induction module to learn relationships among elements of the converted 3-SAT formula;
means for organizing the learned relationships into a plurality of levels;
means for storing data representing the learned relationships in the bijective set memory according to the plurality of levels;

means for using the deduction module and the reduction module to apply a plurality of rejection rules to a knowledge domain associated with the converted input 3-SAT formula, and thereby to reject all elements of the converted input 3-SAT formula which are not satisfiable, thereby leaving a range of a remaining domain as the range of assignments;

means for determining whether the range of the remaining domain includes at least one assignment;

means for providing output indicating that the input 3-SAT formula is satisfiable in response to determining that the remaining domain includes at least one assignment; and means for providing output indicating that the input 3-SAT formula is not satisfiable in response to determining that the remaining domain does not include at least one assignment.

2. The system of claim 1, wherein the means for storing data representing the learned relationships comprises means for storing data representing the learned relationships in a domain of a three-dimensional coordinate system.

3. The system of claim 1, wherein the means for determining whether the input 3-SAT formula is satisfiable comprises means for determining whether the input 3-SAT formula is satisfiable in polynomial time.

4. The system of claim 1, wherein the means for determining whether the input 3-SAT formula is satisfiable comprises means for determining whether the input 3-SAT formula is satisfiable in linear time.

5. The system of claim 1, wherein the means for determining whether the input 3-SAT formula is satisfiable comprises means for determining whether the 3-SAT formula satisfies conditions of a Mobius strip and for concluding that the input 3-SAT formula is not satisfiable if the 3-SAT formula is determined to satisfy the conditions of the Mobius strip.

6. The computer system of claim 1, wherein the conceptions comprise sets, and wherein the perceptions comprise elements of the sets.

7. A computer-implemented method for use in connection with a computer system, the method comprising:
storing, in a bijective set memory, storing data representing bidirectional relationships, comprising:
storing data representing elements in an element memory of the bijective set memory; and
storing data representing classes in a class memory of the bijective set memory;
using a parallel information processor to read input to the computer system and to perform set operations on the input to produce output representing results of the set operations;
using an induction module, under control of the parallel information processor, to use induction to learn relationships between the elements and the classes and to store data representing the learned relationships in the bijective set memory;
using a deduction module, under control of the parallel information processor, to receive data representing input perceptions and to use deduction to retrieve, from the bijective set memory, data representing conceptions having relationships to the input perceptions;
using a reduction module, under control of the parallel information processor, to receive data representing input conceptions and to use reduction to retrieve, from the bijective set memory, data representing perceptions having relationships to the input conceptions;
receiving data representing an input 3-SAT formula;
using the parallel information processor to determine whether the input 3-SAT formula is satisfiable, comprising:
using an inverse function to convert disjunctions of literals in the input 3-SAT formula into semantic equivalent conjunctions, thereby producing data representing a converted input 3-SAT formula;
controlling the induction module to learn relationships among elements of the converted 3-SAT formula;
organizing the learned relationships into a plurality of levels;
storing data representing the learned relationships in the bijective set memory according to the plurality of levels;
using the deduction module and the reduction module to apply a plurality of rejection rules to a knowledge domain associated with the converted input 3-SAT formula, and thereby to reject all elements of the converted input 3-SAT formula which are not satisfiable, thereby leaving a range of a remaining domain as the range of assignments;
determining whether the range of the remaining domain includes at least one assignment;
providing output indicating that the input 3-SAT formula is satisfiable in response to determining that the remaining domain includes at least one assignment; and
providing output indicating that the input 3-SAT formula is not satisfiable in response to determining that the remaining domain does not include at least one assignment.

8. The method of claim 7, wherein storing data representing the learned relationships comprises storing data representing the learned relationships in a domain of a three-dimensional coordinate system.

9. The method of claim 7, wherein determining whether the input 3-SAT formula is satisfiable comprises determining whether the input 3-SAT formula is satisfiable in polynomial time.

10. The method of claim 7, wherein determining whether the input 3-SAT formula is satisfiable comprises determining whether the input 3-SAT formula is satisfiable in linear time.

11. The method of claim 7, wherein determining whether the input 3-SAT formula is satisfiable comprises determining whether the 3-SAT formula satisfies conditions of a Mobius strip and concluding that the input 3-SAT formula is not satisfiable if the 3-SAT formula is determined to satisfy the conditions of the Mobius strip.

12. The method of claim 7, wherein the conceptions comprise sets, and wherein the perceptions comprise elements of the sets.

* * * * *